(12) United States Patent
Lawson, Jr. et al.

(10) Patent No.: US 11,260,904 B2
(45) Date of Patent: Mar. 1, 2022

(54) VEHICLE STEERING LINKAGE AND AXLE ASSEMBLY INCLUDING SAID LINKAGE

(71) Applicant: Thomas Towles Lawson, Jr., Charlottesville, VA (US)

(72) Inventors: Thomas Towles Lawson, Jr., Charlottesville, VA (US); Carl Bailey, Boulder, CO (US)

( * ) Notice: Subject to any disclaimer, the term of this patent is extended or adjusted under 35 U.S.C. 154(b) by 55 days.

(21) Appl. No.: 16/843,571

(22) Filed: Apr. 8, 2020

(65) Prior Publication Data

US 2021/0316783 A1      Oct. 14, 2021

(51) Int. Cl.
    *B62D 7/20*      (2006.01)
    *B62D 7/16*      (2006.01)

(52) U.S. Cl.
    CPC ............ *B62D 7/20* (2013.01); *B62D 7/16* (2013.01)

(58) Field of Classification Search
    CPC . B62D 7/18; B62D 13/04; B62D 7/00; B62D 7/16; B62D 7/20; B64C 25/34; B64C 2025/345; B64C 25/60; B64C 25/50; F16C 11/045; F16C 11/06
    USPC ..................................................... 280/93.51
    See application file for complete search history.

(56) References Cited

U.S. PATENT DOCUMENTS

| 2,146,418 | A |   | 2/1939 | Chapman |       |
| 5,388,855 | A | * | 2/1995 | Yamamoto | B60G 3/20 |
|           |   |   |        |          | 280/124.138 |
| 5,405,162 | A | * | 4/1995 | Chun | B60G 3/20 |
|           |   |   |        |      | 280/124.143 |
| 5,421,606 | A | * | 6/1995 | Chun | B60G 3/20 |
|           |   |   |        |      | 280/124.141 |

(Continued)

FOREIGN PATENT DOCUMENTS

| DE | 102012015333 |   | 2/2014 |         |
| DE | 102012015333 A1 | * | 2/2014 | B62D 7/18 |

(Continued)

OTHER PUBLICATIONS

English Translation of DE102012015333A1 retreived from Espacenet Machine Translations on Jul. 27, 2021 (Year: 2014).*

*Primary Examiner* — Paul N Dickson
*Assistant Examiner* — Caitlin Anne Miller
(74) *Attorney, Agent, or Firm* — Laubscher & Laubscher, P.C.

(57) ABSTRACT

A steering linkage for a vehicle includes a cross-linked pivot assembly which includes a first connector configured for connection with the axle, first and second links, and a second connector configured for connection with a wheel. The first connector has a first end with which a first end of the first link is pivotally connected and a second end with which a first end of the second link is pivotally connected. The second connector has first and second ends and is arranged in spaced relation from and at an angle relative to the first (Continued)

connector. The first end of the second connector is arranged closer to the second end of the first connector than is the second end of the second connector. A second end of the first link is pivotally connected with the first end of the second connector and a second end of the second link is pivotally connected with the second end of the second connector. The cross-linked pivot assembly is operable, preferably via a linear actuator, about a vertical pivot axis to steer the wheel.

15 Claims, 6 Drawing Sheets

(56) References Cited

U.S. PATENT DOCUMENTS

| | | | | |
|---|---|---|---|---|
| 5,845,926 | A * | 12/1998 | Davis | B60G 3/26 |
| | | | | 280/124.136 |
| 8,864,153 | B2 * | 10/2014 | Luttinen | B60G 3/20 |
| | | | | 280/93.507 |
| 8,998,129 | B2 | 4/2015 | Bennett | |
| 9,555,830 | B2 | 1/2017 | Reubens et al. | |
| 2005/0110235 | A1 * | 5/2005 | LeBlanc | B60G 11/28 |
| | | | | 280/124.135 |
| 2011/0089657 | A1 | 4/2011 | Shibuya | |

FOREIGN PATENT DOCUMENTS

| | | | | |
|---|---|---|---|---|
| EP | 1870263 | A2 * | 12/2007 | ............ B60G 7/003 |
| JP | 59223507 | A * | 12/1984 | ............... B60G 3/26 |
| WO | 2004083017 | | 9/2004 | |

* cited by examiner

VEHICLE STEERING LINKAGE AND AXLE ASSEMBLY INCLUDING SAID LINKAGE

BACKGROUND OF THE DISCLOSURE

The present disclosure relates generally to a steering linkage and axle for a vehicle, and more specifically to a steering linkage and axle that provide a wheel turning radius that is greater than with linkages and axles known in the art.

Zero radius turn vehicles are often found in commercial mowing operations and are typically controlled by twin levers which directly or through linkages move trunnions on variable displacement hydraulic pumps. The variable displacement pumps are connected with motors that are connected with two drive wheels. The twin levers control the left and right drive wheel speeds and forward and reverse directions, respectively. Caster wheels, which provide neither traction nor directional stability, are suspended at the end of the vehicle opposite the end with the drive wheels. Moving one lever forward and the other lever in reverse can produce a zero radius turn, though doing so often involves dragging of the caster wheels. Sometimes, in order to transition from a zero radius turn to the left to a sharp turn to the right, the mower needs to complete a multipoint turn, moving in both forward and reverse directions to reach a desired location.

Tractors typically have large rear wheels which are not steered and a front axle with smaller wheels which are steered. Some tractor-based vehicles like lift trucks, back-end loaders, self-propelled windrowers, and certain mowers include steered wheels at the rear of the vehicle. These vehicles have the same platform as tractor-based vehicles with front-steered wheels but are driven in reverse. Independent left and right brakes on the main drive wheels, which are typically the large rear wheels, allow for sharper turns by slowing the inside wheel and shifting torque to the outside main drive wheel, resulting in a decreased turning radius. Because of mechanical limits of traditional steer axles, this decreased turning radius by braking the inside wheel results in scuffing. In theory, a traditional tractor can make a turn while in four-wheel drive by turning about the main drive wheel that is locked in place by its brake, but in practice, the geometry of the front axle prevents such a tight turn.

For tractors known in the art, when the inside wheel is locked, the steering angles of the front wheels do not allow the axes of the front wheels to intersect at the rear inside wheel. To do so, the front right wheel would have to be perpendicular to the length of the tractor. Known steered wheels, especially driven ones, do not turn that sharply. The result of locking the right rear wheel on a traditional tractor, even when the front wheels are steered all the way to the right or left, is that the front wheels are dragged, the left or right rear wheel slips, and the right or left rear wheel slides. Independent brakes help a tractor turn more sharply, but the tractor prevents a pivot turn.

There is thus a need for a steering linkage and axle attached to mowers, tractors or similar vehicles that provide more efficient turns that can be completed at a smaller radius than with those known in the art.

SUMMARY OF THE DISCLOSURE

Accordingly, it is an object of the present disclosure to provide a steering linkage for a vehicle which includes a cross-linked pivot assembly including a first connector configured for connection with the axle, first and second links, and a second connector configured for connection with a wheel. The first connector has a first end with which a first end of the first link is pivotally connected and a second end with which a first end of the second link is pivotally connected. The second connector has first and second ends and is arranged in spaced relation from and at an angle relative to the first connector. The first end of the second connector is arranged closer to the second end of the first connector than is the second end of the second connector. A second end of the first link is pivotally connected with the first end of the second connector and a second end of the second link is pivotally connected with the second end of the second connector. The cross-linked pivot assembly is operable, preferably via a linear actuator, about a vertical pivot axis to steer the wheel.

In one embodiment, the first and second connectors each have an upper end surface and a lower end surface. For the first connector, the first end of the first link is pivotally connected with the lower end surface and the first end of the second link is pivotally connected with the upper end surface. For the second connector, the second end of the first link is pivotally connected with the lower end surface and the second end of the second link is pivotally connected with the upper end surface.

In another embodiment, the first link and second link each have an elongated configuration. Preferably, one of the two links has an L-shaped configuration with which the linear actuator is pivotally connected.

In yet another embodiment, the second link includes a plate having a triangular configuration to which the linear actuator is connected.

It is also an object of the present disclosure to provide a steering axle assembly for a vehicle which includes a steering axle and a cross-linked pivot assembly as described above connected with the opposite ends of the axle. The cross-linked pivot assembly is operable about a vertical pivot axis to steer the wheel. When a wheel is pivotally connected with each of the cross-linked pivot assemblies, and the pivotable connector rotates about the vertical axis, the wheel rotates between first and second positions that are at least 150-degrees apart.

In one embodiment, there is also a torque arm connected with the steering axle and a linear actuator having a first end pivotally connected with one of the first link and the second link and a second end pivotally connected with the torque arm.

BRIEF DESCRIPTION OF THE FIGURES

Other objects and advantages of the disclosure will become apparent from a study of the following specification when viewed in the light of the accompanying drawing, in which.

DETAILED DESCRIPTION

Figure 1:
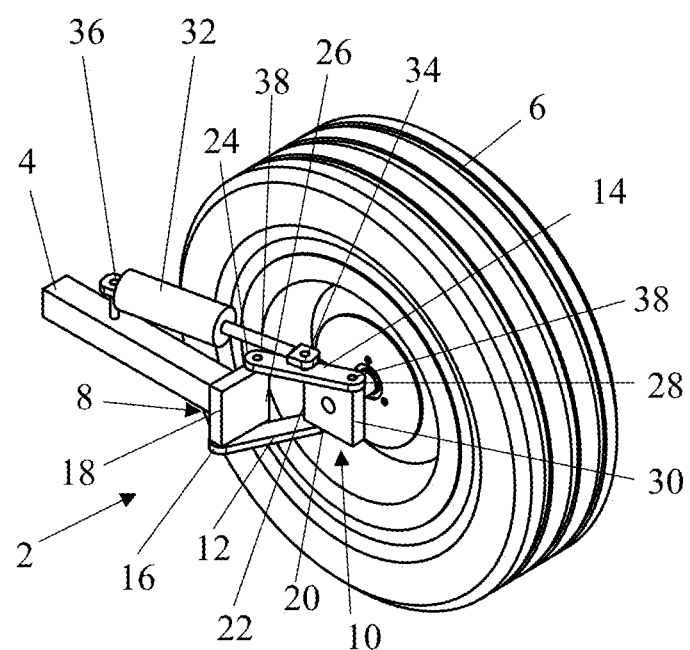
FIGS. 1 and 2 are perspective and top views, respectively, of a first embodiment of a steering linkage connected with an axle and wheel according to the present disclosure.
Figure 2:
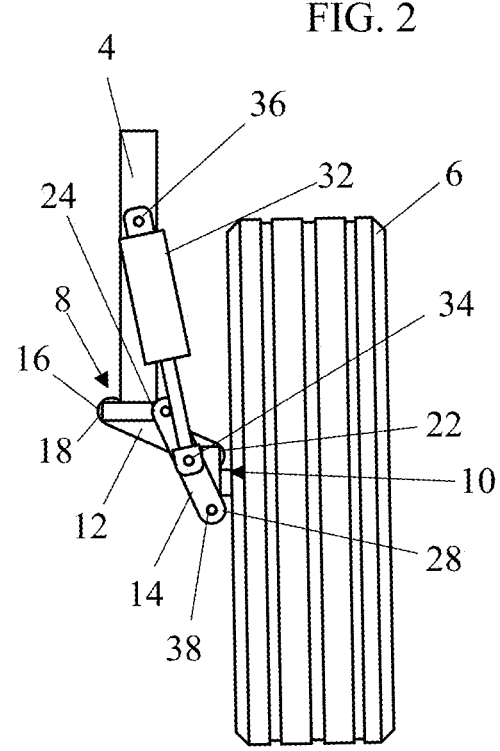

The present disclosure relates to a steering linkage for a steering axle and to a steering axle assembly that includes a steering linkage. Referring first to FIGS. 1 and 2, a first embodiment of a cross-linked pivot assembly 2 connected between an axle 4 and a steerable wheel 6 is shown. The pivot assembly includes a first connector 8 connected with the axle and a second connector 10 connected with the wheel. The connectors are pivotally connected via first 12 and second 14 links, wherein a first end 16 of the first link is pivotally connected with a first end 18 of the first connector, a second end 20 of the first link is pivotally connected with a first end 22 of the second connector, a first end 24 of the second link is pivotally connected with a second end 26 of the first connector, and a second end 28 of the second link is pivotally connected with a second end 30 of the second connector. A linear actuator 32 has a first end 34 pivotally connected with the second link and a second end 36 that is pivotally connectable with the axle, a torque arm or a similar device. When the linear actuator 32 is engaged, it provides a pushing force on the second link 14 rotating all of the links about their respective pivot points 38 to rotate the wheel 6. As will be discussed in more detail below, the pivot assembly allows a wheel to rotate approximately 180-degrees from a first turn position to a second turn position.

The links of the embodiment in FIGS. 1 and 2 are elongated link arms, and the connectors are square plates. As is shown in other embodiments, the links and connectors can have alternate geometric configurations. Beyond those shown in the figures, the links and connectors could have additional configurations including that of a polygon, a cube, a sphere, a cylinder, or a prism, to name a few, without deviating from the spirit of the invention. Most important, the links are all pivotally cross-linked from one connector to another and each link is arranged on a separate horizontal plane from another link such that it can freely rotate.

Figure 3:
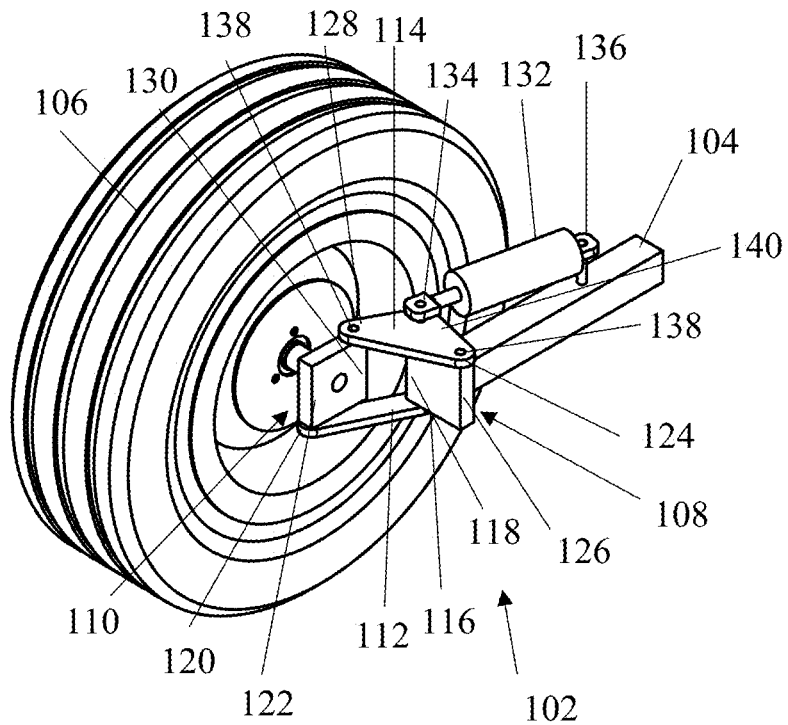
FIGS. 3 and 4 are perspective and top views, respectively, of a second embodiment of a steering linkage connected with an axle and wheel.
Figure 4:
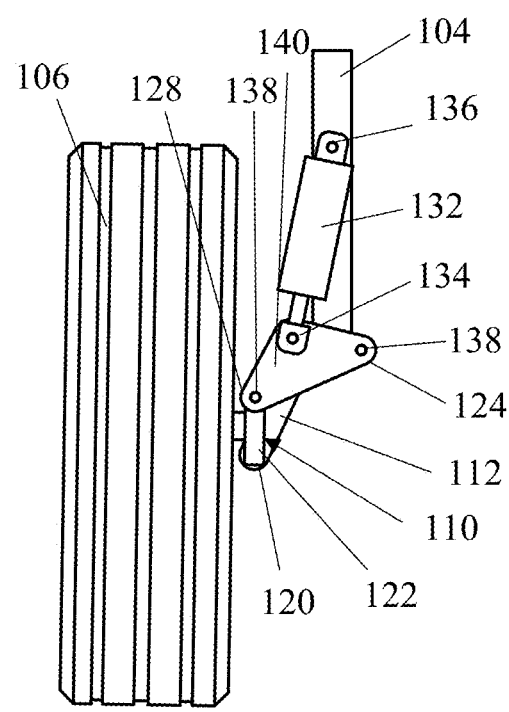

FIGS. 3 and 4 show a similar embodiment to that of FIGS. 1 and 2. The cross-linked pivot assembly 102 is connected between an axle 104 and a wheel 106. It includes a first connector 108 connected with the axle, a second connector 110 connected with the wheel, and first 112 and second 114 links pivotally cross-connected between the two connectors. Notably, the second link 114 in this embodiment has a triangular configuration. A first end 116 of the first link 112 is pivotally connected with a first end 118 of the first connector 108, and a second end 120 of the first link is pivotally connected with a first end 122 of the second connector 110. The second link 114 has a first end vertex 124 pivotally connected with the second end 126 of the first connector 108 and a second end vertex 128 pivotally connected with a second end 130 of the second connector 110. The linear actuator 132 has a first end 134 pivotally connected with the third vertex 140 of the second link and a second end 136 configured for pivotal connection with the axle or a torque arm.

Figure 5:
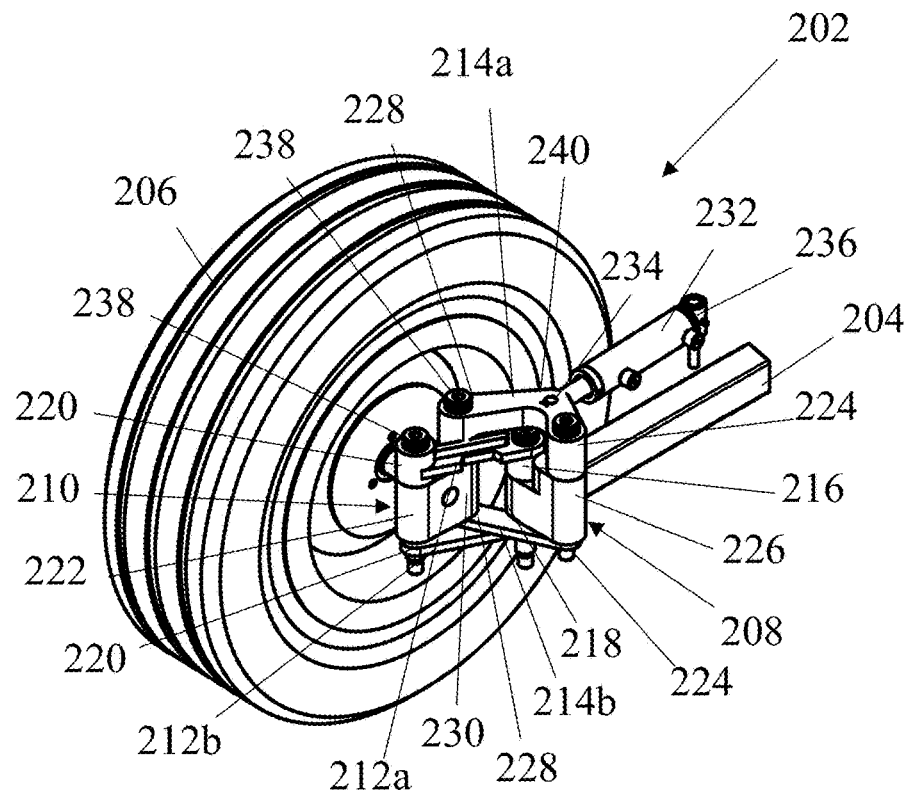
FIGS. 5 and 6 are perspective and top views, respectively, of a third embodiment of a steering linkage connected with an axle and wheel.
Figure 6:
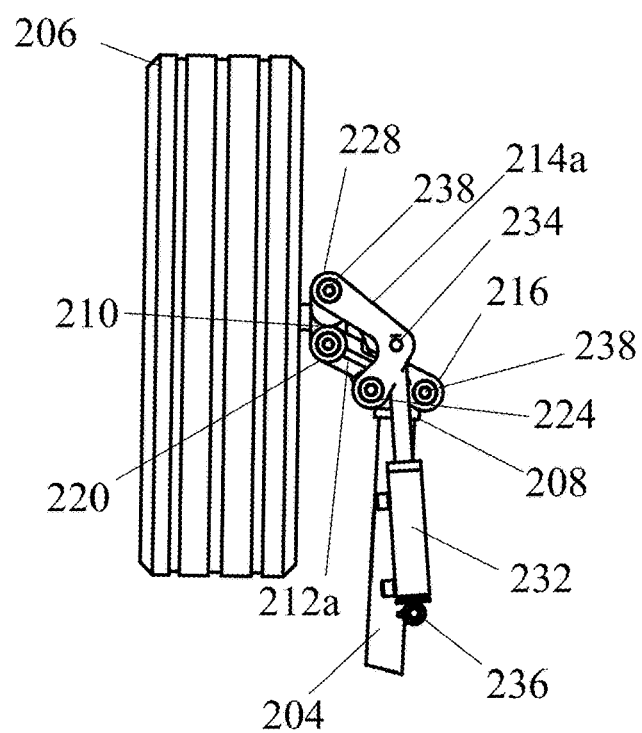

FIGS. 5 and 6 show a third embodiment of a cross-linked pivot assembly 202 having four links pivotally connected between the first 208 and second 210 connectors which are connected with an axle 204 and wheel 206, respectively. For this pivot assembly 202, the first connector 208 has a first end 218, to which a first end 216 of a first upper link 212a and a first end 216 of a first lower link 212b are pivotally connected. The first connector also has a second end 226 to which a first end 224 of a second upper link 214a and a first end 224 of a second lower link 214b are pivotally connected. The second connector 210 has a first end 222 to which a second end 220 of the first upper link 212a and a second end 220 of the first lower link 212b are pivotally connected. It also has a second end 230 to which a second end 228 of the second upper link 214a and a second end 228 of the second lower link 214b are pivotally connected. The second upper link 214a is an arm with an elbow 240 having an L-shaped configuration. A linear actuator 232 has a first end 234 pivotally connected with the elbow of the second upper link and a second end 236 pivotally connectable with the axle 204 or a torque arm (shown in FIGS. 9-12). Each set of links, the first upper and lower links 212a, 212b and second upper and lower links 214a, 214b, have shared pivot pins 238 that connect the respective link ends to respective connector ends. The upper links 212a, 214a are each connected with an upper end of each connector such that the second upper link is arranged along a horizontal plane located above the horizontal plane along which the first upper link is arranged. Similarly, the lower links 212b, 214b are each connected with a lower end of each connector such that the second lower link is arranged along a horizontal plane located above the horizontal plane along which the first lower link is arranged. When the linear actuator 232 is engaged, it applies either a pushing or pulling force on the elbow 240 of the second upper link 214a causing that link and the second lower link 214b to rotate about a vertical axis that extends through their respective first ends 224, in turn causing the first upper link 212a and first lower link 212b to rotate about a vertical axis extending through their first respective ends 216 to rotate and steer the wheel 206. Each of the links 212a, 212b, 214a, 214b are cross connected from the first connector to the second connector. As noted above, this is critical to the function of the steering linkage.

Figure 7:
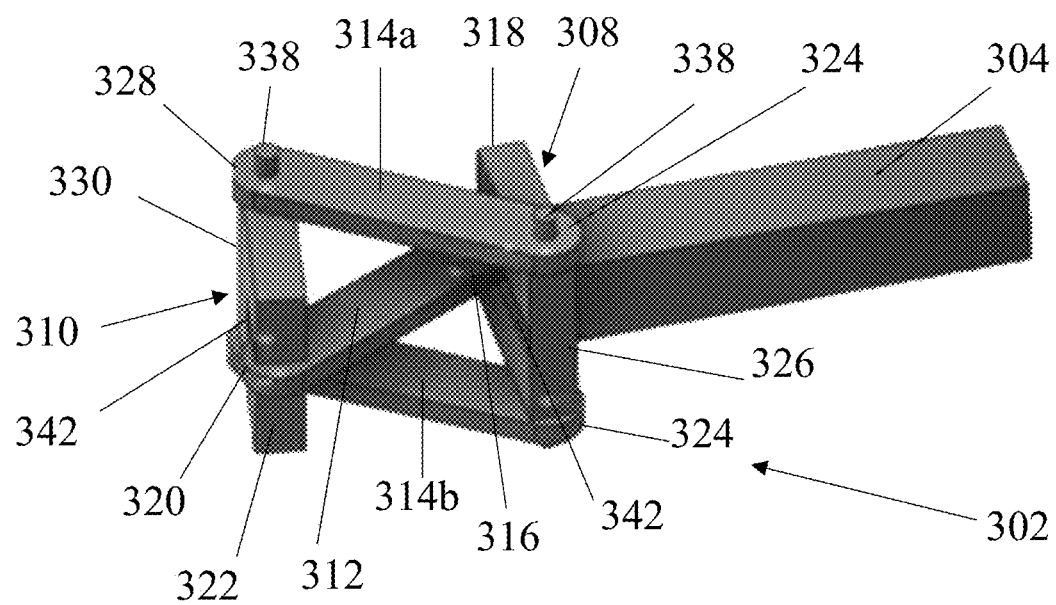
FIGS. 7 and 8 are perspective and top views, respectively, of a fourth embodiment of a steering linkage connected with an axle.
Figure 8:
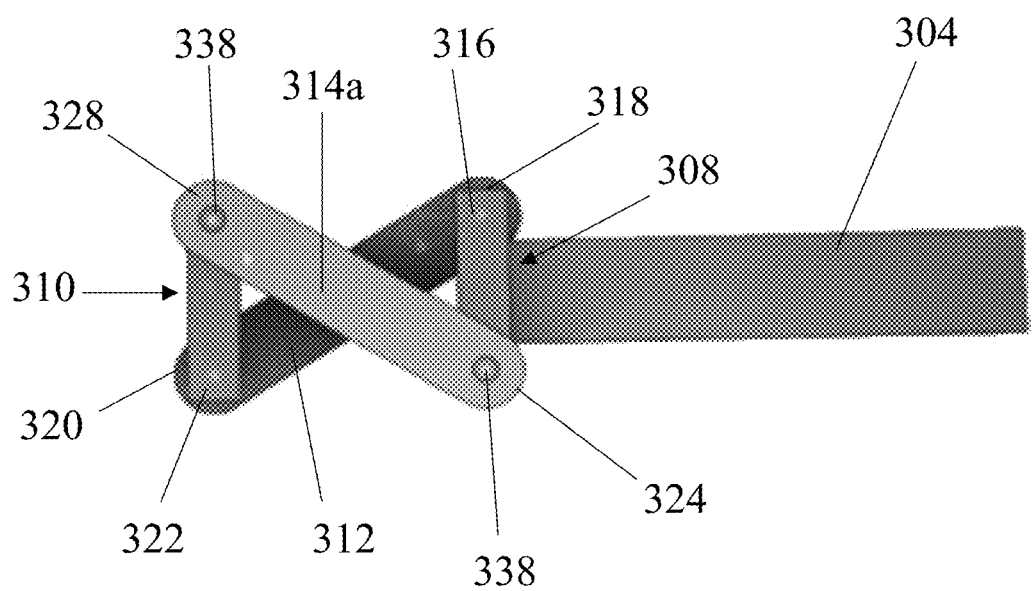
Figure 9:
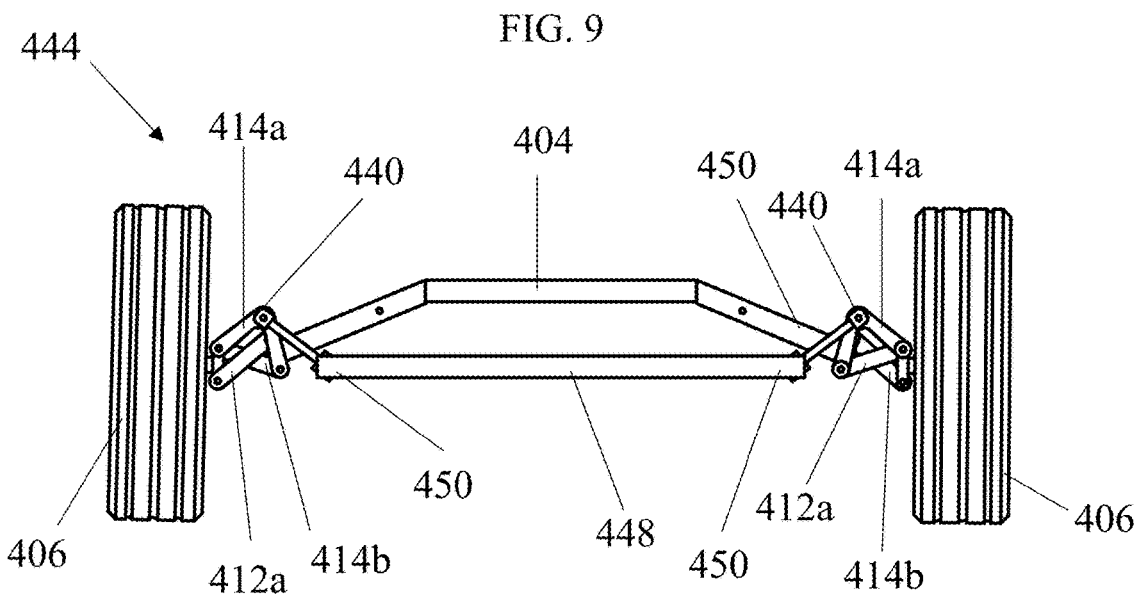
FIGS. 9 and 10 are top and front views of a steering axle assembly.
Figure 10:
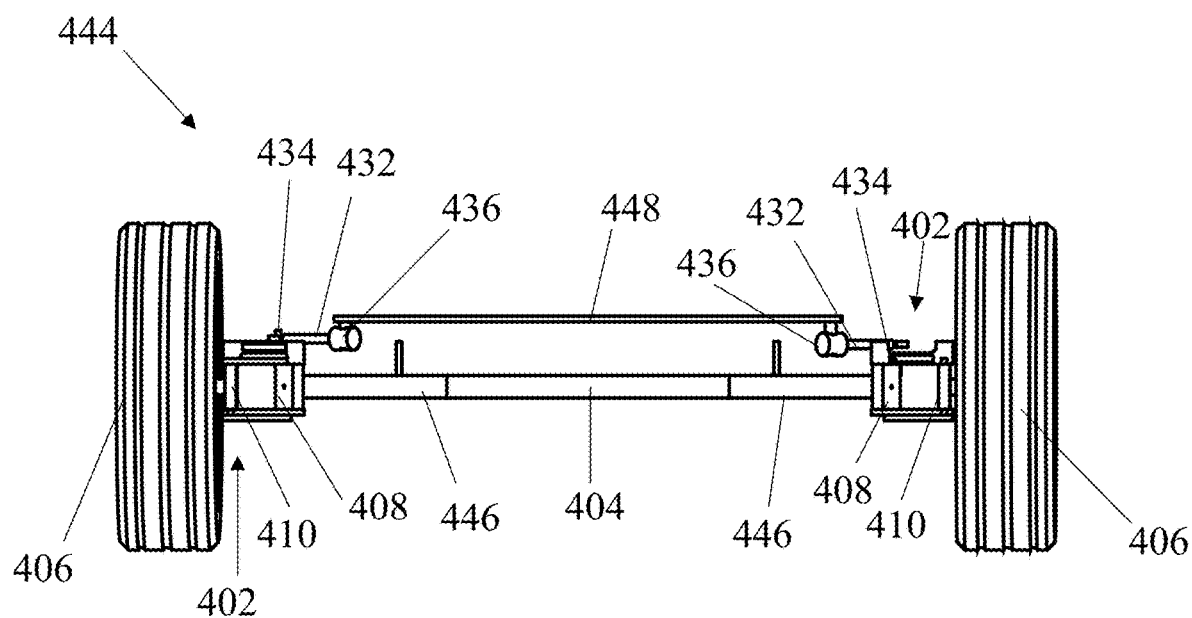

FIGS. 7 and 8 show an embodiment of a steering linkage similar to that of FIGS. 1 and 2 but the pivot assembly 302 has an upper link 314a, a middle link 312, and a lower link 314b. A first connector 308 has a first end 318 to which a first end 316 of the middle link 312 is pivotally connected and a second end 326 to which first ends of the upper link 314a and lower link 314b are pivotally connected. There is a second connector 310 having a first end 322 to which the second end 320 of the middle link 312 is pivotally connected and a second end 330 to which second ends 328 of the upper link 314a and lower link 314b are pivotally connected. All three links extend between the connectors along separate, horizontal planes. The first and second connectors further contain midsection openings 342 arranged along the rotation path of the middle link 312 providing space for the that link to rotate. As with the previous embodiments, it is important to the function of the steering linkage that each link be cross connected from the first connector to the second connector.

Referring now to FIGS. 9-12, an embodiment of a steering axle assembly 444 connected with a pair of wheels 406 is shown. The assembly includes an axle 404 having opposite ends 446, two cross-linked pivot assemblies 402 each connected with the opposite ends, and a torque arm 448 connected with the pivot assemblies.

The pivot assemblies include a first connector 408 and a second connector 410, four cross connected links 412a, 412b, 414a, 414b, and a linear actuator 432. The first connector is connected with the axle 404 and the second connector is connected with a wheel 406. Between the connectors, there is a first upper link 412a, a first lower link 412b, a second upper link 414a, and a second lower link 414b, each of which are pivotally cross connected with the connectors as described above in the pivot assembly embodiment of FIGS. 5 and 6. The linear actuator 432 is pivotally connected at a first end 434 with the elbow 440 of the second upper link 414a and at a second end 436 with an end 450 of the torque arm. When the torque arm is operated, it engages the actuators on each end of the axle, rotating the links and in turn steering the wheels.

Figure 11:
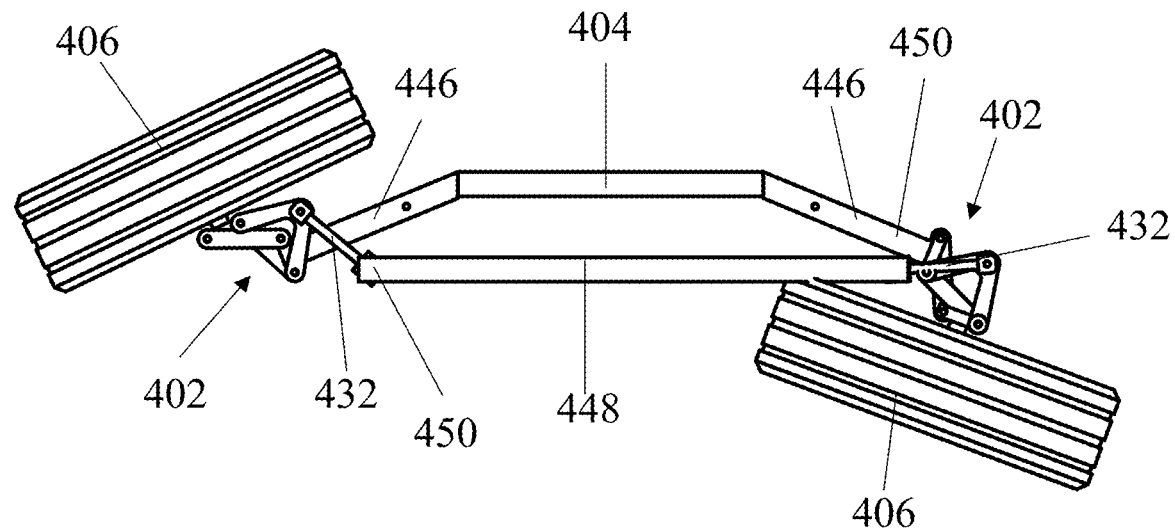
FIGS. 11 and 12 are top and perspective views, respectively, of the steering axle assembly embodiment shown in FIGS. 9 and 10 with the wheels turned to the right and left, respectively.
Figure 12:
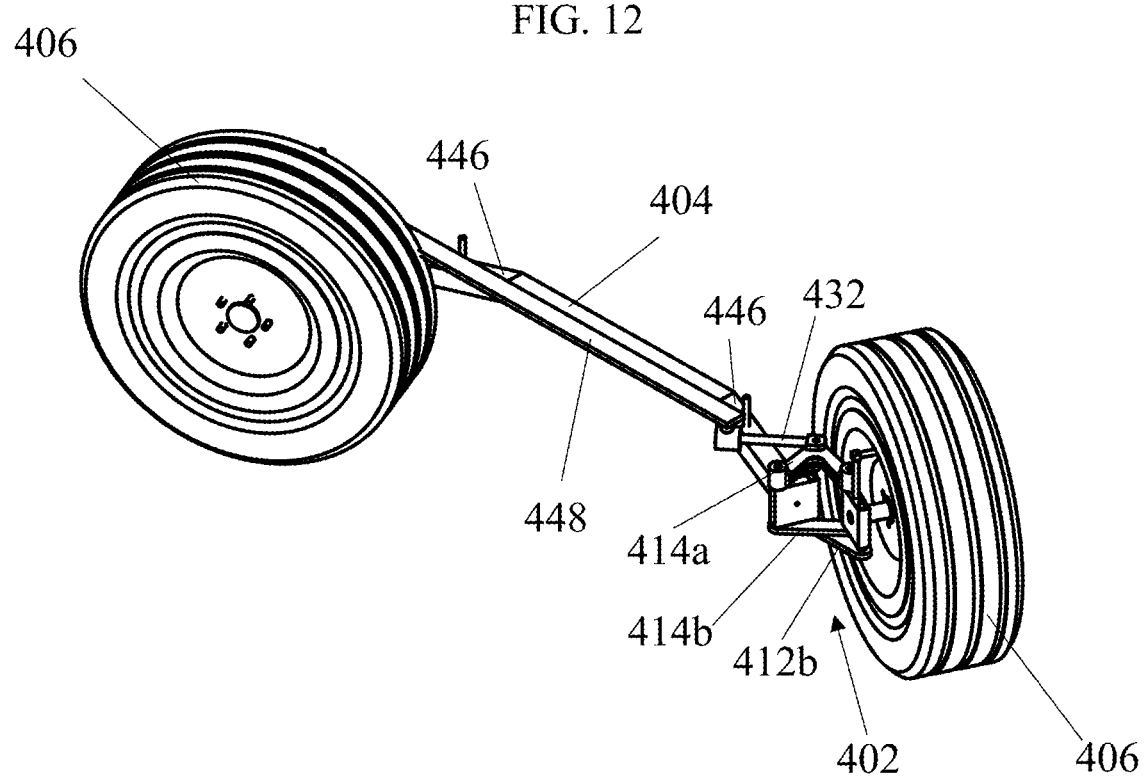

FIGS. 11 and 12 show the wheels 406 steered to the right and left, respectively. Due to the configuration of the axle ends 446, when the wheels are turned, they are arranged in parallel with the axle ends which together allows for a steering angle that is much greater than with axles known in the art. When the wheels are rotated from a full right turn to a full left turn or vice versa, the wheels rotate between positions that are approximately 180-degrees apart. It will be understood by those with ordinary skill in the art that other ranges of rotation are possible.

Although the above description references particular embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. A steering linkage for a vehicle, comprising a cross-linked pivot assembly connected between an axle and a steerable wheel of the vehicle, including:
   (a) a first connector configured for connection with the axle, said first connector having a first end, a second end, an upper end surface and a lower end surface;
   (b) a first link having a first end pivotally connected with said first end of said first connector and a second end;
   (c) a second link having a pivotally connected with said second end of said first connector and a second end, one of said first link first end and said second link first end being pivotally connected with said first connector lower end surface; and
   (d) second connector configured for connection with the wheel and arranged in spaced relation from and at an angle relative to said first connector, said second connector having a first end and a second end, said second connector first end being arranged closer to said first connector second end than said second connector second end, said first link second end being pivotally connected with said first end of said second connector and said second link second end being pivotally connected with said second end of said second connector, whereby said cross-linked pivot assembly is operable about a vertical pivot axis to steer the wheel.

2. A steering linkage as defined in claim 1, said first end of said first link being pivotally connected with said lower end surface and said first end of said second connector being pivotally connected with said upper end surface.

3. A steering linkage as defined in claim 2, wherein said second connector further has an upper end surface and a tower end surface, said second end of said first link being pivotally connected with said lower end surface and said second end of said second link being pivotally connected with said upper end surface.

4. A steering linkage as defined in claim 1, and further comprising a linear actuator having a first end connected with one of said first link and said second link and a second end configured for connection with one of the axle and a torque arm.

5. A steering linkage as defined in claim 4, and further comprising pivot pins connecting said first link and said second link with said connectors.

6. A steering linkage as defined in claim 4, wherein at least one of said first link and said second link has an elongated configuration.

7. A steering linkage as defined in claim 4, wherein one of said first link and said second link has an L-shaped configuration, said linear actuator being pivotally connected with said L-shaped link.

8. A steering linkage as defined in claim 4, wherein one of said first link and said second link comprises a triangular plate, said linear actuator being connected with said triangular plate.

9. A steering linkage as defined in claim 4, wherein said first connector is integral with the axle.

10. A steering linkage as defined in claim 4, and further comprising at least one additional link having a first end pivotally connected with said first connector and a second end pivotally connected with said second connector, said additional link being parallel with and arranged between said first and second links.

11. A steering axle assembly for a vehicle, comprising:
   (a) a steering axle having opposite ends; and
   (b) a cross-linked pivot assembly connected with each said opposite ends, said cross-linked pivot assembly including:
      (1) a first connector configured for connection with the axle, said first connector having a first end, a second end, an upper end surface and a lower end surface;
      (2) a first link having a first end pivotally connected with said first end of said first connector and a second end;
      (3) a second link having a first end pivotally connected with said second end of said first connector and a second end, one of said first link first end and said second link first end being pivotally connected with said first connector lower end surface; and
      (4) a second connector configured for connection with the wheel and arranged in spaced relation from and at an angle relative to said first connector, said second connector having a first end and a second end, said second connector first end being arranged closer to said first connector second end than said second connector second end, said first link second end being pivotally connected with said first end of said second connector and said second link second end being pivotally connected with said second end of said second connector, whereby when a wheel is pivotally connected with each said cross-linked pivot assembly, said second connector rotates about a vertical axis, the wheel rotates between first and second positions at least 150-degrees apart.

12. A steering axle assembly as defined in claim 11, and further comprising:
   (c) a torque arm connected with said steering axle; and
   (d) a linear actuator having a first end pivotally connected with one of said first link and said second link and a second end pivotally connected with said torque arm.

13. A steering linkage for a vehicle, comprising a cross-linked pivot assembly connected between an axle and a steerable wheel of the vehicle, including:

(e) a first connector configured for connection with the axle, said first connector having a first end and a second end;

(f) a first link having a first end pivotally connected with said first end of said first connector and a second end;

(g) a second link having a first end pivotally connected with said second end of said first connector and a second end; and (h) a second connector configured for connection with the wheel and arranged in spaced relation from and at an angle relative to said first connector, said second connector having a first end and a second end, said second connector first end being arranged closer to said first connector second end than said second connector second end, a distance between said first and second connector being greater than a width of said first connector, said first link second end being pivotally connected with said first end of said second connector and said second link second end being pivotally connected with said second end of said second connector, whereby said cross-linked pivot assembly is operable about a vertical pivot axis to steer the wheel.

14. A steering linkage as defined in claim 13, wherein said first connector further has an upper end surface and a lower end surface, said first end of said first link being pivotally connected with said lower end surface and said first end of said second connector being pivotally connected with said upper end surface.

15. A steering linkage as defined in claim 14, wherein said second connector further has an upper end surface and a lower end surface, said second end of said first link being pivotally connected with said lower end surface and said second end of said second link being pivotally connected with said upper end surface.

* * * * *